United States Patent Office 3,532,849
Patented Oct. 6, 1970

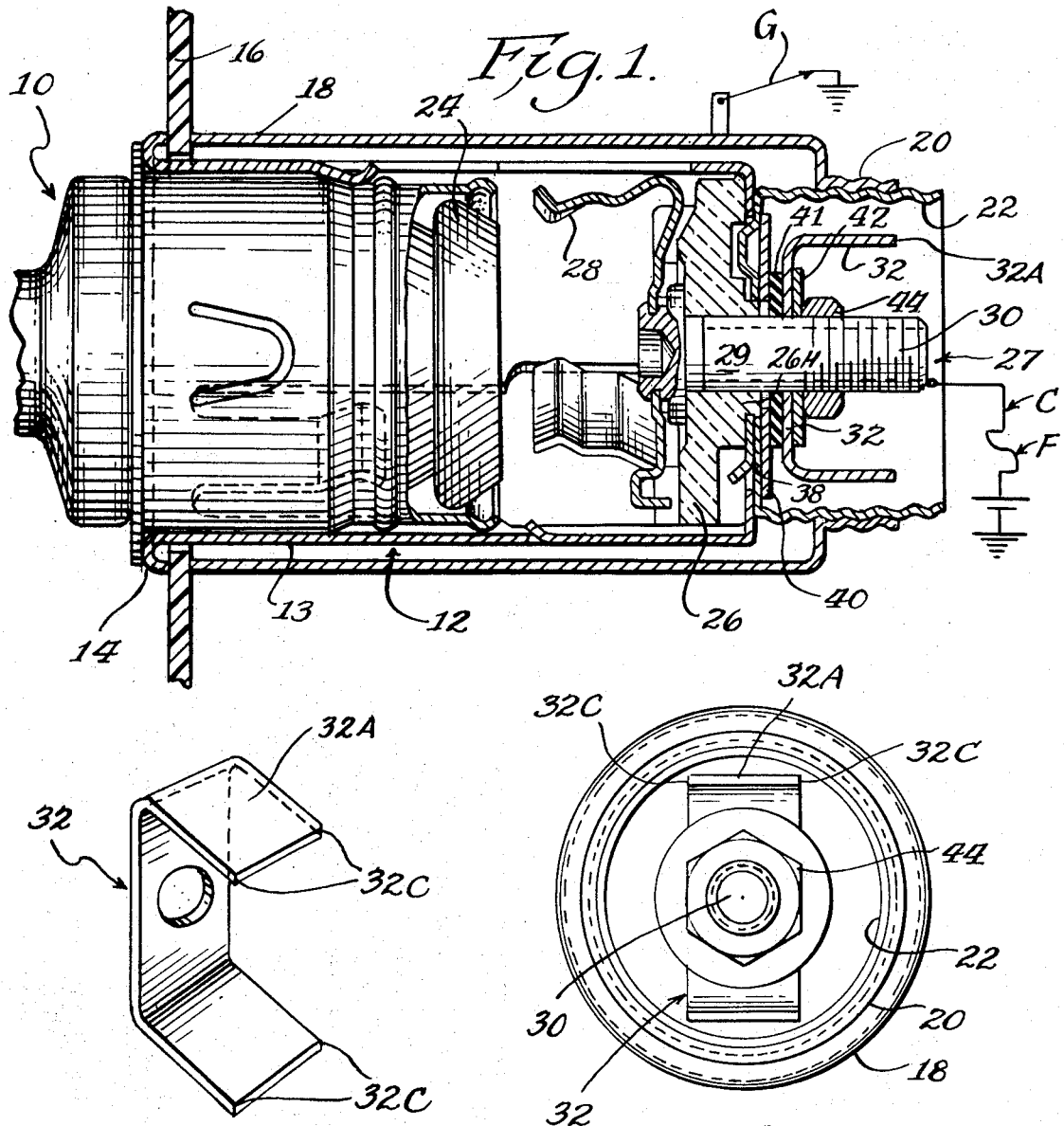

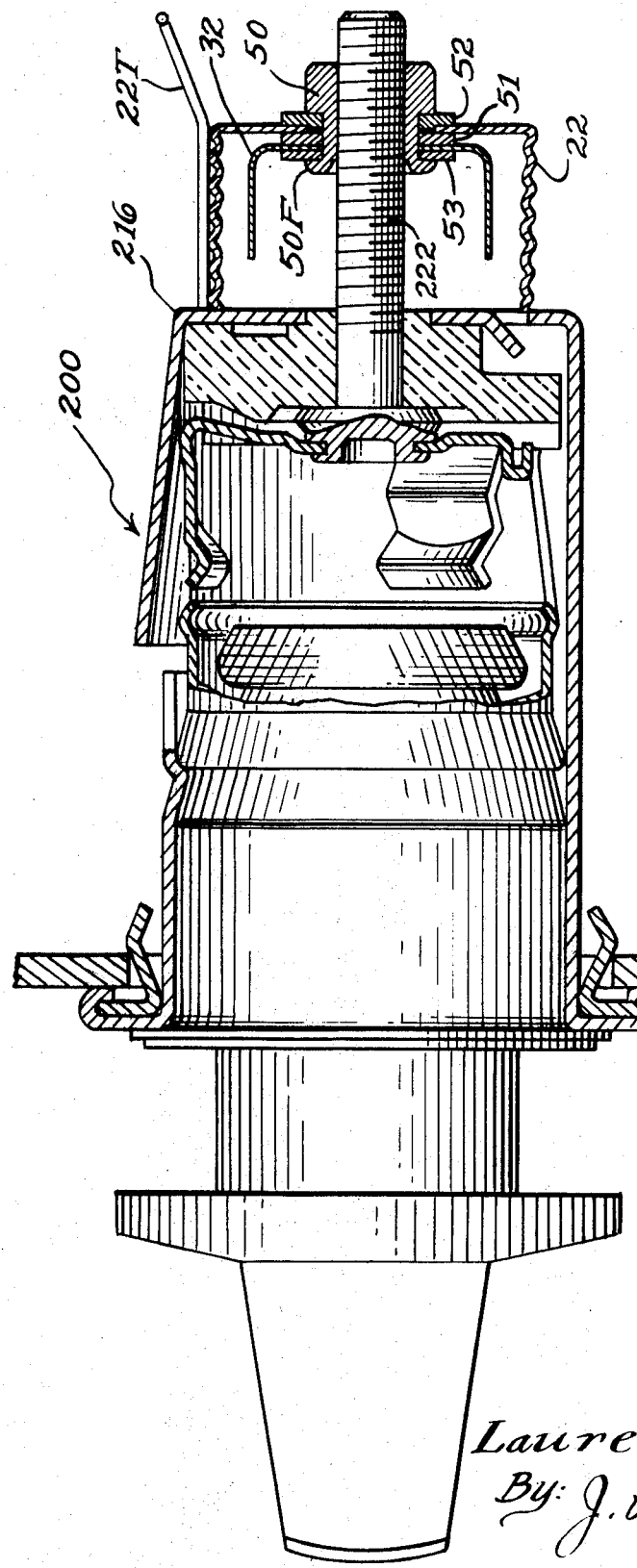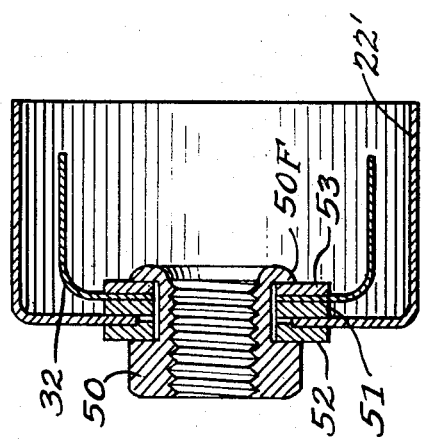
Fig. 4.
Fig. 5.
Inventor:
Laurence G. Horwitt
By: J. Patrick Cagney
Atty.

3,532,849
BIMETAL SHUNT FOR ELECTRIC CIGAR LIGHTER
Laurence G. Horwitt, New Haven, Conn., assignor to Casco Products Corporation, Bridgeport, Conn., a corporation of Connecticut
Filed June 9, 1969, Ser. No. 831,440
Int. Cl. F23g 7/24
U.S. Cl. 219—265                     10 Claims

ABSTRACT OF THE DISCLOSURE

An electrical cigar lighter having a circuit shorting arrangement comprising a housing, means for attaching the housing on the rear end of the igniting unit receptacle, the housing being grounded and having a generally U-shaped bimetal element mounted in spaced electrically insulated relation to the housing and connected in an electrical path that is normally fed from a line circuit containing a fuse. The bimetal element is mounted for responding to excessive heating of the igniting unit to create temporary shunt contact against the housing and thereby blow the line fuse.

---

This invention relates generally to electrically energized cigar lighters, and more particularly to holders for such cigar lighters having improved circuit shunting means for protecting the cigar lighter against the effects of a fault condition in the electric circuit.

Typically, the cigar lighters in current use have a holder that includes a conductive shell for removably supporting an igniting unit, the shell carrying an input terminal adjacent its back or inner end having contact means for contact with the inner end of the igniting unit when the latter is to be energized, such contact being broken when the igniting unit reaches a normal operating temperature.

The electric cigar lighter art is familiar with various thermal safety arrangements. In my U.S. Pat. No. 3,439,148, a circuit breaker is incorporated directly in the lighter unit and permits convenient resetting from the front. Such an arrangement is widely utilized in current production autos and has proven to be reliable and long lasting, but there is a continuing need for an arrangement that is less complex and less costly to produce.

The art is also familiar with the use of separate thermal devices (pellet type thermal fuse structures such as utilize sulphur or other suitable materials) which are screwed on the beack end of the lighter unit to respond to overload and open circuit. For reset of these prior art devices, the mechanic must reach behind the dashboard panel to remove the line connection and to remove and replace the thermal device. The difficulty and cost of such replacement is objectionable. Moreover, in some instances, access to the rear of the panel is not readily available.

In accordance with the present invention the holder of the electric cigar lighter is provided with a bimetal shunt which is responsive upon excessive heating of the igniting unit to provide a temporary short across the line circuit for the lighter to actuate the line fuse. Accordingly, the present invention provides a cigar lighter having a circuit shorting arrangement which is automaticly resettable upon cool down and which is less complex and less costly than the known circuit breaker constructions.

The bimetal shunt is shown within a separate adaptor shell which is in electrical contact with a main holder shell.

In one embodiment, the bimetal shunt and adaptor shell are incorporated as permanent elements of a complete new lighter assembly and, in another embodiment, the bimetal shunt and adaptor shell are incorporated in the form of a separate adaptor unit for attachment to a basic lighter unit.

In the disclosed embodiments the bimetal shunt is illustrated as a separate U-shaped element electrically and thermally connected to the input terminal structure of the lighter to expand laterally and produce a temporary short circuit. The U-form is easier to handle in automated machinery and provides a symmetry that is less subject to tolerance or mounting clearance variations.

The adaptor shell may be of smooth surface configuration or of screw form to limit contact of the bimetal therewith to a single point. The contact surface of the adaptor shell is of a high melting point metal to insure that several shunting cycles can be achieved without the possibility of welding occurring between the bimetal and the adaptor shell.

The present invention is directed toward a cigar lighter, of the general type described above, but having a simplified circuit shorting construction which avoids or substantially eliminates the disadvantages of the earlier thermal safety devices, and yet retains the advantageous feature of positive protection of the igniter unit against excessive heating.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 1 is a longitudinal cross section of a cigar lighter embodying the present invention with the igniter unit being shown in elevation, the circuit shorting bimetal element being shown in open circuit position;

FIG. 2 is an end elevational view of the lighter with the bimetal element being shown in open circuit position;

FIG. 3 is a perspective view of the bimetal element; and

FIGS. 4 and 5 show adaptor embodiments incorporating the invention.

Referring to the drawings, and particularly to FIG. 1, one embodiment of the present invention comprises a cigaer lighter of the type having an igniting unit 10 which is removably supported within a holder 12. The holder 12 includes a hollow tube or main shell 13 having an open end surrounded by a return bend flange 14. The holder is inserted through an aperture in the instrument panel 16 of an automobile or other suitable mounting surface, and is secured therein by a clamping shell 18 which has a threaded neck 20 engaging a screw-type adaptor shell 22 on the back end of the main shell 13, thereby forcing the outer end of the clamping shell against the inner surface of the panel 16.

The igniting unit 10 has a heating coil (not shown) which is contained within a contact cup 24 to which one end of the heating coil is connected. The other end of the heating coil is grounded through the body of the igniting unit 10, the main shell 13 and the clamping shell 18.

Where the dashboard is of a conductive material, as has been conventional, it serves as a ground path for both the holder 12 and the shell 18. As shown here, the dashboard is of platic material and a ground lead G is connected to the clamping shell 18.

The holder 12 also includes a contact support means in the form of an insulating base 26 disposed in the rear of the main shell 13 and having a central bore for receiving a contact stud assembly 27. The contact stud assembly has a plurality of bimetallic contact fingers 28 located forwardly of the base to engage and hold the contact cup 24 of the igniting unit 10 when the latter is to be energized, the fingers 28 being moveable in response to heat, when the igniting unit heating coil reaches normal operating temperature to open the circuit to the heating coil.

The contact fingers 28 are connected to a suitable source of current, such as the automobile battery, by means of the contact stud 29, the rear end of which serves as an input terminal 30. A conductive bimetal shunt element 32 is located intermediary along the contact stud.

Thus, the bimetal shunt element 32 is located within a housing defined by the screw shell 22 which is open at the rear and which includes an apertured front wall 38 having a central opening sized to receive the stud 29 with adequate radial clearance to maintain the screw shell insulated from the live contact stud. The screw shell 22 is solidly grounded by virtue of being positively seated in the threaded neck 20 of the grounded clamping shell 18.

The front wall of the screw shell is piloted upon a stepped hub portion 26H of the insulating base 26 and is in electrical contact with the rear wall 38 of the main shell and the contact stud 29 is snugly received in the central bore of the base to insure the desired radial clearance between these parts.

The bimetal shunt element 32 is electrically connected to the contact stud 29 and normally is electrically isolated from the screw shell 22. For this purpose, the stud assembly is shown as including a steel washer 40 seated against the interior face of the shell wall 38, an insulation washer 41, the bimetal shunt 32, a flat washer 42, and a hex nut 44 snugly threaded upon the stud 29 to secure the parts in axial alignment.

According to the principles of the present invention, the bimetal shunt element 32 is subjected to heat generated by the heating coil of the igniting unit, such heat being transferred through the head and shank portions of the stud 29. The bimetal shunt element is configured to distort and provide a low impedance path capable of drawing current from the line circuit C in excess of the current value required to blow the fuse F.

In the particular arrangement shown herein for purposes of illustrative disclosure the bimetal element is generally U-shaped and has a base portion carrying parallel legs 32A that extend in spaced apart flanking relation to the stud, and in spaced but adjacent relation to the surrounding wall of the screw shell. The bimetal shunt 32 is arranged to expand in response to heating to produce a short circuit upon contact of its arms with the screw shell 22. The reaction range of the bimetal shunt is to be at a higher temperature level than can be produced by sporadic relight. A suitable material for the shunt is marketed by Texas Instruments as Truflex Type P–3. In the preferred embodiment the bimetal 32 is of .012 inch stock with the exterior faces of the legs 32A being 0.25 inch wide and being spaced 0.55 inch across and the adaptor shell 22 has a minimum I.D. of 0.67 to insure a clearance of 0.02 inch between any of the four corners 32C of the bimetal's legs and the inside surface of the screw shell. For the relationships given herein the bimetal shunt will actuate within 30 to 60 seconds with a 7½ ampl. load at 13.6 volts.

The pitch of the thread on the screw shell 22 is 14 t.p.i. in the illustrated embodiment such that only one corner of the bimetal will touch at the time of shorting, thus facilitating the ability of the arrangement to break free upon cool down. The adaptor shell 22 may be a brass sleeve or may be a steel sleeve coated with copper or other high melting temperature material to permit an increased number of thermal cycles of the shunt without welding of the shunt to the adaptor shell.

If in the operation of the cigar lighter a fault condition occurs which causes the heating coil of the igniting unit 10 to heat excessively, the heat is transferred through the stud 29 to the bimetal element 32. This causes the legs 32A to move radially outwardly so that the corners 32C will contact the sidewall of the shell 22. In the case of a screw shell having a threaded profile as illustrated, one corner will contact the shell wall and draw sufficient current to blow the line fuse.

The fault condition which causes the foregoing operation may be an overheating condition of the igniting unit heating coil or any other condition capable of causing sufficient heating of the bimetallic element to cause the outward leg movement as described.

In the typical situation the blowing of the fuse will terminate the overheating and upon cool down the legs 32A will return to the illustrated position to remove the short circuit. After removal of the fault condition the line fuse is replaced.

A significant improvement of this invention resides in the simple and foolproof automatic action of the bimetal shunt element and the ruggedness and reliability of its mounting arrangement.

It will now be apparent, from the foregoing, that there is provided a cigar lighter having a simplified resettable circuit breaker feature incorporated therewith. Good electrical contact is insured at all times by the direct and positive short circuit contact effected by the bimetal shunt against the adaptor shell. Release is facilitated by the screw configuration of the shell which establishes the short through only one of the corners 32C.

In the embodiment of FIGS. 1 to 3, the invention is shown as incorporated in a complete new assembly of a lighter unit, however, it may be embodied as an adaptor unit for attachment to an existing lighter arrangement. Thus, in FIGS. 4 and 5, adaptor embodiments of the invention are shown, as applied to a lighter unit 200 of the type shown in Horwitt U.S. Pat. No. 3,424,414, the disclosure of which, to the extent not inconsistent herewith, is specifically incorporated herein by this reference. The lighter unit 200 is the type shown in FIG. 3 of Pat. No. 3,424,414, and the corresponding parts shown herein are referenced by corresponding numbers in the 200 series.

As shown in the embodiment of FIG. 4, the adaptor unit is comprised of a substantially similar screw shell 22 mounted in insulated encircling relation upon the shank portion of a tapped bushing 50 by means of insulator washers 51, 52. A bimetal shunt element 32 encircles the shank of the bushing between the insulator 52 and a final metal washer 53. The end of the bushing 50 is flanged as indicated at 50F to secure the assembly in a relationship wherein the shell 22 is electrically isolated and the bimetal shunt 32 is electrically and thermally united with the bushing 50. The clearance between the adaptor shell and bimetal shunt is the same as shown for the embodiment of FIGS. 1 to 3.

The adaptor is mounted on the conducting post 222 of the lighter unit 200, the adaptor being shown reversed in that the open end of the shell 22 and the legs of the bimetal shunt face forwardly or toward the lighter. The post 222 is longer than the corresponding part shown at 22 in FIG. 3 of Pat No. 3,424,414 to provide sufficient end clearance for accommodating reverse mounting of the adaptor with sufficient exposure of the post to facilitate connection to a line circuit.

In FIG. 4, the edge of the shell 22 abuts the end wall of the receptacle 216 to provide an electrical path to ground. The shell is shown with a ground tab 22T projecting along the lighter body. The ground tab is optional.

In FIG. 5, a similar adaptor is shown but it incorporates a shell 22' of plain wall configuration.

The type of fault which is to be protected is seldom encountered so that the economics demand an extremely simple and low cost construction. The present invention provides embodiments that achieve this result.

The particular U-shape illustrated herein for the bimetal shunt 32 is preferred because such a two-legged shape is easier to handle in automated machinery and because the mounting symmetry of the two-legged shape relative to the stud and relative to the peripheral wall of the adaptor shell reduces spacing variations such as could arise from errors in the sizing and/or location of the center hole in the base portion of the shunt. Where these factors are of less consequence, it is contemplated that the shunt may omit one of the leg portions or may have some other shape dependent on the mounting environment that it to be provided.

It is also contemplated that the bimetal shunt could be located within the main shell 13, for example the shunt can be incorporated as a portion of the contact means that is associated with the igniting unit and can provide a short against a surrounding wall only when subjected to the predetermined excess heating condition.

When the unit is cycled sufficiently to finally cause the contact point of the bimetal shunt 32 to weld to the surrounding shell 22, it has been found that upon refusing the circuit, the weld joint will break before blow- the new fuse. The initial short circuit current tends to melt the weld and the bimetal shunt tends to restore to original configuration. The combination of these effects breaks the weld. This automatic reset phenomenon has been proven particularly in the case of the copper coated screw shell form disclosed herein.

Thus, while preferred constructional features of the invention are embodied in the structure illustrated herein, it is to be understood that changes and variations may be made by those skilled in the art without departing from the spirit and scope of the appended claims.

What I claim as my invention is:

1. A holder for an igniting unit of an electric cigar lighter comprising a conductive shell structure to removably support the igniting unit, electric input means supported in insulated relation by the shell structure and having heat responsive contact means to releasably engage the igniting unit for controlling energization thereof and bimetal shunt means supported for movement relative to said shell structure and electrically and thermally connected with said input means to respond upon excessive heating of the igniting unit and distort into shorting electrical contact with said shell structure.

2. A holder in accordance with claim 1 wherein said input means includes a contact stud projecting axially of said shell structure and said bimetal shunt means includes a bimetal element having a base portion anchored on said stud and responsive upon predetermined thermal buildup to deflect against said shell structure.

3. A holder in accordance with claim 1 wherein said input means includes a contact stud projecting axially of said shell structure and said bimetal shunt means includes a generally U-shaped bimetal element having a base portion centrally anchored on said stud and leg portions extending generally parallel to said stud and each responsive upon predetermined thermal buildup to deflect against said shell structure.

4. A holder in accordance with claim 1 wherein said conductive shell structure includes a main shell having a rear wall provided with a central opening and an adaptor shell having a front wall rearwardly of and abutting said rear wall and provided with a central opening in registry with the first-named opening, said input means includes a contact stud projecting axially through said wall openings and through said adaptor shell and said bimetal shunt means includes a bimetal element having a base portion anchored on said stud and a leg portion extending in close clearance relation to said adaptor shell and responsive upon predetermined thermal buildup to deflect against said adaptor shell.

5. A holder in accordance with claim 4 wherein said leg portion extends parallel to said stud and said adaptor shell has its peripheral wall of screw thread form of predetermined pitch so that only one point of initial contact will exist when said leg portion contacts said peripheral wall whereby disengagement and return of said leg portion is facilitated.

6. A holder for an igniting unit of an electric cigar lighter comprising a conductive shell structure adapted to removably support the igniting unit in a relationship to continue an energizing path for the igniting uit from a line circuit that is fused to open at a current value in excess of the normal load current of the igniting unit, electric input means supported in insulated relation by said conductive shell structure and having heat responsive electric contact means engageable with the igniting unit for making electrical contact therewith when the igniting unit is to be energized and for opening said electrical contact when the igniting unit reaches a normal operating temperature and bimetal shunt means supported for movement relative to said shell structure and electrically and thermally connected with said input means to respond when the igniting unit reaches a predetermined temperature in excess of said normal operating temperature to move into electrical contact with said shell structure for providing a low impedance path capable of drawing current from said line circuit in excess of said predetermined value to effect opening of said circuit whereby said shunt means, upon cool down of the igniting unit, automatically resets to open circuit the low impedance path.

7. An adaptor unit for mounting upon an electrical input contact stud at the rear of a holder for the igniting unit of an electric cigar lighter, said holder having an elongate hollow main shell open at a forward end to removably support the igniting unit and having a rear wall provided with a central opening for receiving said stud in insulated relation and having electric contact means connected to said stud and disposed in the main shell to cooperate with the inner end of the lighting unit, said adaptor unit comprising a tapped conductive bushing for mounting on said stud, a conductive adaptor shell having a transverse wall provided with a central opening for reception of said bushing, a bimetal element having a base portion and at least one leg portion, said base portion having a central opening for reception of said bushing, means for mounting said adaptor shell in insulated relation on said bushing and for mounting said bimetal element in conductive relation on said bushing with said leg portion projecting in spaced relation alongside the inner periphery of the adaptor shell whereby said leg portion moves outwardly to contact said shell upon predetermined heating thereof.

8. An adaptor unit in accordance with claim 7 wherein said bimetal element is generally U-shaped, with said base portion centrally anchored on said bushing.

9. An adaptor unit in accordance with claim 7 wherein said leg portion extends parallel to said bushing and said adaptor shell has its peripheral wall of screw thread form of predetermined pitch so that only one point of initial contact will exist when said leg portion contacts said peripheral wall whereby disengagement and return of said leg portion is facilitated.

10. A holder in accordance with claim 2 wherein said shell structure has a copper coated peripheral wall of screw thread form of predetermined pitch so that only one point of initial contact will exist when said leg portion contacts said peripheral wall whereby disengagement and return of said leg portion is facilitated.

References Cited

UNITED STATES PATENTS

| | | | |
|---|---|---|---|
| 2,858,409 | 10/1958 | Dening | 219—264 |
| 2,914,637 | 11/1959 | Wuerth | 337—103 |
| 3,248,502 | 4/1966 | Lybrook | 337—103 |
| 3,424,414 | 1/1969 | Horwatt | 248—27 |
| 3,439,148 | 4/1969 | Horwatt | 219—265 |

VOLODYMYR Y. MAYEWSKY, Primary Examiner

U.S. Cl. X.R.

219—267, 512; 337—103

UNITED STATES PATENT OFFICE
CERTIFICATE OF CORRECTION

Patent No. 3,532,849     Dated October 6, 1970

Inventor(s) Laurence G. Horwitt

It is certified that error appears in the above-identified patent and that said Letters Patent are hereby corrected as shown below:

Col. 2, line 55: "Cigaer" should be --cigar--;
Col. 3, line 6: "platic" should be --plastic--;
Col. 5, line 22: "it" should be --is--;
Col. 5, line 60: After "stud" should be inserted --and a leg portion extending generally parallel to said stud--;
Col. 6, line 19: "uit" should read --unit--.

SIGNED AND SEALED
MAR 9 1971

(SEAL)
Attest:

Edward M. Fletcher, Jr.
Attesting Officer

WILLIAM E. SCHUYLER, JR.
Commissioner of Patents